United States Patent
Gronitzki

(10) Patent No.: US 10,690,248 B2
(45) Date of Patent: Jun. 23, 2020

(54) INJECTION MOLDED SEAL RINGS AND METHODS FOR MAKING THEM

(71) Applicant: Saint-Gobain Performance Plastics L+S GMBH, Wertheim (DE)

(72) Inventor: Micro Gronitzki, Wertheim (DE)

(73) Assignee: Saint-Gobain Performance Plastics L+S GmbH, Wertheim (DE)

( * ) Notice: Subject to any disclaimer, the term of this patent is extended or adjusted under 35 U.S.C. 154(b) by 29 days.

(21) Appl. No.: 15/866,193

(22) Filed: Jan. 9, 2018

(65) Prior Publication Data

US 2018/0195617 A1 Jul. 12, 2018

Related U.S. Application Data

(60) Provisional application No. 62/444,783, filed on Jan. 10, 2017.

(51) Int. Cl.
*F16J 15/328* (2016.01)
*B29C 45/00* (2006.01)
(Continued)

(52) U.S. Cl.
CPC ......... *F16J 15/328* (2013.01); *B29C 45/0025* (2013.01); *F16J 15/441* (2013.01);
(Continued)

(58) Field of Classification Search
CPC ......... F16J 15/328; F16J 15/44; F16J 15/441; F16J 15/443
See application file for complete search history.

(56) References Cited

U.S. PATENT DOCUMENTS 2,485,862 A    10/1949  Caza
3,614,183 A    10/1971  Berens
(Continued)

FOREIGN PATENT DOCUMENTS

DE    102007034418 A1    1/2009
EP    0783082 A1    7/1997
(Continued)

OTHER PUBLICATIONS

Kakehi et al., "Development of Low Torque Seal Ring for Automotive Transmission," NTN Technical Review No. 81, 68-73 (2013).
(Continued)

*Primary Examiner* — Gilbert Y Lee
(74) *Attorney, Agent, or Firm* — McDonnell Boehnen Hulbert & Berghoff LLP

(57) ABSTRACT

The present disclosure relates generally to seal rings useful in oil-lubricated systems such as automobile transmissions, torque converters and automatic clutches. In one embodiment, the disclosure provides an injection molded seal ring comprising a circular ring body extending between a first end and a second end engageable with the first end, the circular ring body including an inner circumferential face; an outer circumferential face; a first lateral face; a second lateral face opposing the first lateral face; a recess formed in the outer circumferential face, the recess not extending to both the first lateral edge and the second lateral edge of the outer circumferential face; and an injection molding gate vestige disposed in the recess, the injection molding gate vestige not extending beyond the outer circumferential face.

23 Claims, 5 Drawing Sheets

(51) Int. Cl.
*F16J 15/44* (2006.01)
*B29D 99/00* (2010.01)
*B29L 31/26* (2006.01)

(52) U.S. Cl.
CPC .............. *B29C 2045/0027* (2013.01); *B29C 2045/0036* (2013.01); *B29D 99/0053* (2013.01); *B29L 2031/265* (2013.01)

(56) References Cited

U.S. PATENT DOCUMENTS

| | | | |
|---|---|---|---|
| 5,303,936 A * | 4/1994 | Kuroki | F16J 15/3284 277/411 |
| 5,403,536 A | 4/1995 | Hanyuda | |
| 5,628,519 A * | 5/1997 | Kakehi | B29C 45/2616 264/328.12 |
| 5,673,923 A | 10/1997 | Watanabe | |
| 5,882,012 A * | 3/1999 | Niwa | F16J 9/14 277/407 |
| 5,934,680 A | 8/1999 | Kakehi | |
| 6,189,896 B1 | 2/2001 | Dickey | |
| 6,257,202 B1 | 7/2001 | Ohta | |
| 6,349,943 B1 | 2/2002 | Ishii | |
| 6,468,068 B1 * | 10/2002 | Abe | B29C 45/0025 249/57 |
| 6,884,827 B2 | 4/2005 | Ota | |
| 7,341,256 B2 | 3/2008 | Nakaoka | |
| 7,766,339 B2 | 8/2010 | Umetsu | |
| 8,028,997 B2 | 10/2011 | Shimazu | |
| 9,239,113 B2 | 1/2016 | Nagai | |
| 10,309,539 B2 * | 6/2019 | Kakehi | F16J 15/3248 |
| 2002/0001182 A1 | 1/2002 | Stark | |
| 2002/0158424 A1 | 10/2002 | Yanagiguchi | |
| 2003/0122318 A1 | 7/2003 | Yanagiguchi | |
| 2004/0251634 A1 | 12/2004 | Shimazu | |
| 2005/0116426 A1 | 6/2005 | Watanabe | |
| 2006/0038355 A1 | 2/2006 | Nakaoka | |
| 2006/0178267 A1 | 8/2006 | Kim | |
| 2008/0011551 A1 | 1/2008 | Inazuka | |
| 2009/0051117 A1 | 2/2009 | Crudgington | |
| 2009/0194948 A1 | 8/2009 | Wirt | |
| 2009/0212502 A1 | 8/2009 | Bordenet | |
| 2012/0112415 A1 | 5/2012 | Benjamin | |
| 2015/0086802 A1 * | 3/2015 | Maeda | B29C 43/145 428/519 |
| 2015/0115542 A1 | 4/2015 | Neumann | |
| 2016/0116066 A1 | 4/2016 | Watanabe | |
| 2016/0186862 A1 * | 6/2016 | Kondou | C09K 3/1006 277/500 |
| 2017/0107865 A1 * | 4/2017 | Yasuda | F16J 15/164 |
| 2018/0231127 A1 * | 8/2018 | Kakehi | F16J 15/18 |
| 2018/0258889 A1 | 9/2018 | Ishigaki | |

FOREIGN PATENT DOCUMENTS

| | | | |
|---|---|---|---|
| EP | 1445518 A1 | 8/2004 | |
| FR | 1351829 | 2/1964 | |
| JP | H0875007 A | 3/1996 | |
| JP | H08233110 A | 9/1996 | |
| JP | H08276508 A | 10/1996 | |
| JP | H0989111 A | 3/1997 | |
| JP | H0994851 A | 4/1997 | |
| JP | H0996363 A | 4/1997 | |
| JP | 2001004032 A | 1/2001 | |
| JP | 2003035367 A | 2/2003 | |
| WO | 9402762 | 2/1994 | |
| WO | WO-9402762 A1 * | 2/1994 | B29C 33/005 |
| WO | 9804853 A1 | 2/1998 | |
| WO | 2006001281 A1 | 1/2006 | |
| WO | 2016014585 A1 | 1/2016 | |

OTHER PUBLICATIONS

International Search Report and Written Opinion in PCT/IB2018/000055, dated Aug. 2, 2018.

* cited by examiner

US 10,690,248 B2

INJECTION MOLDED SEAL RINGS AND METHODS FOR MAKING THEM

CROSS-REFERENCE TO RELATED APPLICATIONS

The present application claims the benefit of priority of U.S. Provisional Patent Application No. 62/444,783, filed Jan. 10, 2017, which is hereby incorporated herein by reference in its entirety.

BACKGROUND OF THE DISCLOSURE

1. Field of the Disclosure

The present disclosure relates generally to components useful in systems such as automobile transmissions, torque converters and automatic clutches. The present disclosure relates more particularly to injection molded seal rings useful in rotating systems such as oil-lubricated systems and pneumatic systems, and methods for making such seal rings.

2. Technical Background

Seal rings are commonly used in assemblies like transmissions and clutches to limit fluid leakage and pressure loss, especially in parts of the assemblies under high pressure. These are typically used in rotating connections in conjunction with a liquid such as an oil or other lubricant.

An example of a conventional rotating connection is shown in perspective schematic view in FIG. 1. Here, a seal ring is disposed about a rotating shaft at a joint thereof, in a groove such that it seals against the surrounding housing. The seal ring is fixed neither to the shaft nor the housing, so that it can rotate with respect to either or both. The seal ring itself has three sealing faces, as shown in the cross-sectional schematic view of FIG. 2. The outer circumferential face of the seal ring seals against the housing in which the shaft and seal ring are disposed. One of the lateral faces seals against the sidewall of a groove formed in the shaft. In many cases, only one of the lateral faces is actually sealed against a surface when installed. Nonetheless, seal rings are typically made to be symmetric, so that they can be installed without regard to which direction they face. Accordingly, a seal ring needs to have three faces that are sufficiently flat and circular to seal against a cooperating surface (i.e., of a groove or of a housing).

Any manufacturing defects in the outer circumferential face or either lateral face can cause the seal to fail. High-precision injection molding techniques are thus typically used to manufacture such seal rings. Injection molding can create highly precise structures with flat faces. However, an injection molding process typically results in a so-called "vestige" at the position on the seal ring at which the molten plastic material enters the mold, i.e., through a gate (i.e., the entrance into the mold cavity through which molten plastic flows into the cavity). This vestige can create a small bump or other surface imperfection that can interfere with the sealing of a face on which it is disposed. Because it is the only face not required for sealing, conventional seal rings are typically injection molded through a gate disposed along the inside circumferential face of the seal ring. This can provide a seal ring with good sealing performance, but greatly complicates manufacture as it requires a more complex injection system.

SUMMARY OF THE DISCLOSURE

In one aspect, the present disclosure provides an injection molded seal ring comprising a circular ring body extending between a first end and a second end engageable with the first end, the circular ring body comprising
  an inner circumferential face;
  an outer circumferential face opposing the inner circumferential face having a first lateral edge and an opposed second lateral edge;
  a first lateral face extending between the inner circumferential face and the opposing outer circumferential face;
  a second lateral face opposing the first lateral face, disposed between the inner circumferential face and the opposing outer circumferential face;
  a recess formed in the outer circumferential face, the recess not extending to both the first lateral edge and the second lateral edge of the outer circumferential face; and
  an injection molding gate vestige disposed in the recess, the injection molding gate vestige not extending beyond the outer circumferential face.

In another aspect, the disclosure provides a method of making a seal ring as described herein, the method including
  providing a mold having a cavity, the cavity having a that is the inverse of the injection molded seal ring, with an injection molding gate coupled to the cavity at a position in the recess corresponding to the position of the injection molding gate vestige of the seal ring;
  injecting molten polymer into the cavity through the gate;
  allowing the polymer to harden; and
  removing the seal ring from the mold and forming the injection molding gate vestige by detaching it from a polymer runner at a surface of the recess of the seal ring.

In another aspect, the present disclosure provides an apparatus that includes
  a rotating shaft;
  a seal ring disposed about the rotating shaft, with its first lateral face and/or its second lateral face disposed against a sidewall of a groove associated with the rotating shaft; and
  a housing or a bore disposed about the shaft and the seal ring, such that the outer circumferential face of the seal ring is disposed against an inner circumferential face of the housing or bore.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

Figure 1:
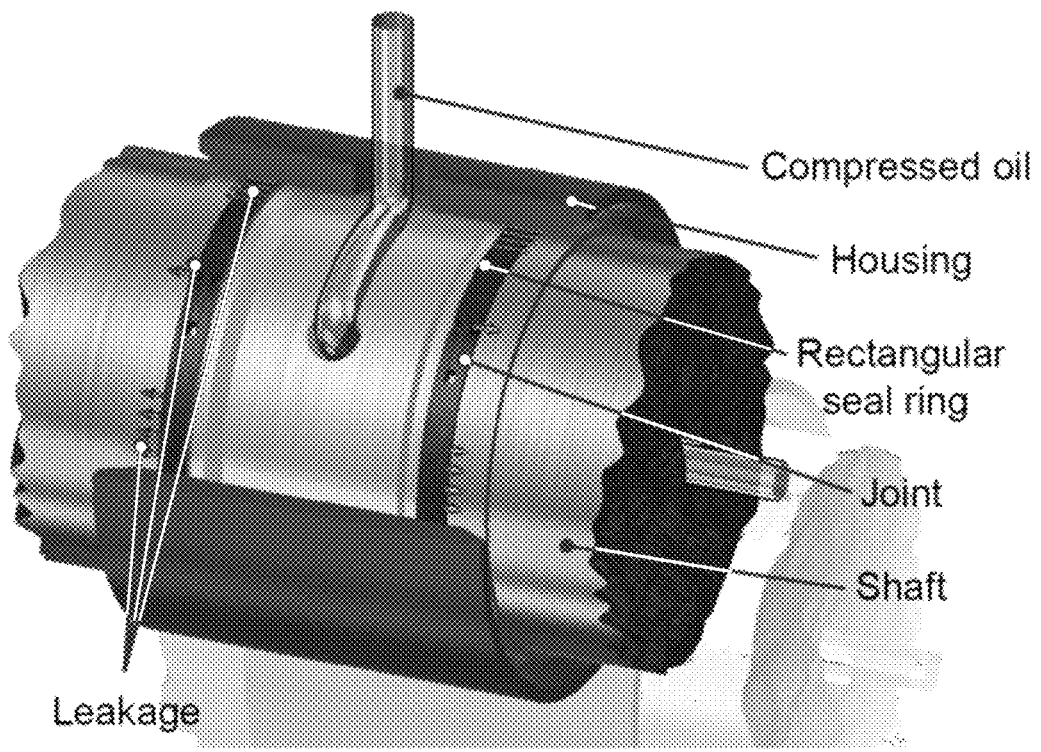
FIG. 1 is a schematic perspective view of a conventional rotating connection.

The present inventor has noted the disadvantages described above with respect to injection molding at the inner circumferential face of a seal ring. To overcome these disadvantages, yet retain the necessary sealing performance, the present disclosure provides seal rings in which the injection molding process is performed through a gate at the outer circumferential face thereof. The mold is designed such that a recess is formed in the outer circumferential face of the seal ring. The gate is positioned such that the flow of the molten plastic is through this recess, such that the injection molding gate vestige is disposed within the recess of the molded seal ring, such that it does not extend beyond the outer circumferential face thereof. The recess in the outer circumferential face does not extend to both the first lateral edge and the second lateral edge of the outer circumferential face, so that the lateral portion of the outer circumferential face that is not recessed can provide the necessary sealing performance.

One aspect of the disclosure is an injection molded seal ring. An example of such a seal ring is shown in schematic perspective view in FIG. 3, and in partial schematic perspective view in FIG. 4. Injection molded seal ring 300 has a circular ring body 302 extending between a first end 304 and a second end 306. As will be discussed in more detail below, second end 306 is engageable with first end 304, such that the ends of the seal ring can be pulled apart to be placed around a shaft, and close down to have a circular outer circumference when the ends are allowed to come back together. The circular ring body is defined in part by an inner circumferential face 310 and an outer circumferential face 312, opposing the inner circumferential face. The outer circumferential face 312 has a first lateral edge 314 and an opposed second lateral edge 316. Extending between the inner circumferential face 310 and the outer circumferential face 312 are a first lateral face 320 and a second lateral face 322 opposing the first lateral face 320.

Notably, the seal ring includes a recess 330 formed in its outer circumferential face 312. This recess 330 is shown in more detail in the schematic cross-sectional view of FIG. 5 (i.e. taken at a point along the circumference of the seal ring at which the recess is disposed). The recess 330 does not extend to both the first lateral edge 314 and the second lateral edge 316 of the outer circumferential face 312. Rather, in this embodiment, the recess 330 extends to the first lateral edge 314 of the outer circumferential face 312, but does not extend to the second lateral edge 316 of the outer circumferential face 312. Disposed in the recess is an injection molding gate vestige 340. The injection molding gate vestige 340 does not extend beyond the outer circumferential face 312 (i.e., in a radial direction), so that it does not interfere with the sealing of the outer circumferential face.

As the person of ordinary skill in the art will appreciate, the injection molding gate vestige is the bump, roughness, or other mark left in the part at the site of the injection molding gate as a result of the injection molding process. It can result, for example, from the detachment of the seal ring from a runner at the site of the gate. It can extend, for example, at least 100 microns, at least 200 microns, or even at least 500 microns from a surface (e.g., a bottom surface, such as indicated by reference numeral 332 in FIG. 5) of the recess on which it is disposed. For example, in certain embodiments, the injection molding gate vestige extends in the range of 100 to 1000 microns, e.g., 100 to 800 microns, or 100 to 500 microns, or 200 to 1000 microns, or 200 to 800 microns, or 200 to 500 microns from a surface of the recess on which it is disposed. Because this injection molding gate vestige is positioned within the recess, away from any sealing face of the seal ring, it does not interfere with the sealing performance of the seal ring.

The outer circumferential face of the seal ring desirably has a low surface roughness, so as to provide an adequate seal against an inner circumferential face of a housing or bore. Of course, as the person of ordinary skill will appreciate, some roughness resulting from conventional manufacturing processes can be acceptable. Because the first and second lateral faces are typically specified as sealing faces as described above, in certain desirable embodiments they also desirably have a low surface roughness. And as the person of ordinary skill in the art will appreciate, the presence of larger features formed as depressions in a face (e.g., fluid-handling grooves) is not considered to impact the surface roughness of the face; rather, it is sufficient for the sealing portion of the face to have a low surface roughness. A face having a low surface roughness as described herein can have, for example, a surface roughness $R_a$ value less than 5 microns, less than 2 microns, or even less than 1 micron (e.g., 0.2-1 micron); a surface roughness $R_z$ value less than 20 microns, less than 10 microns, or even less than 5 microns (e.g., 1-5 microns); and/or a surface roughness $R_{max}$ value less than 30 microns, less than 20 microns, or even less than 10 microns (e.g. 2-8 microns), all measured as described in ISO 4287. Because the first and second lateral faces are typically specified as sealing faces as described above, in certain desirable embodiments they are also have a low surface roughness.

Figure 3:
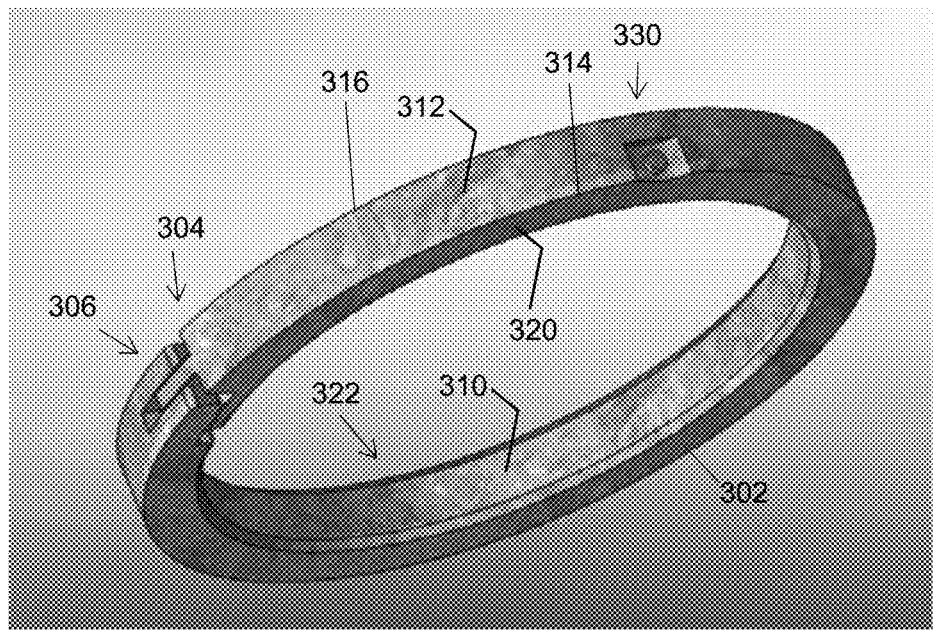
FIG. 3 is a schematic perspective view of a seal ring according to one embodiment of the disclosure.
Figure 4:
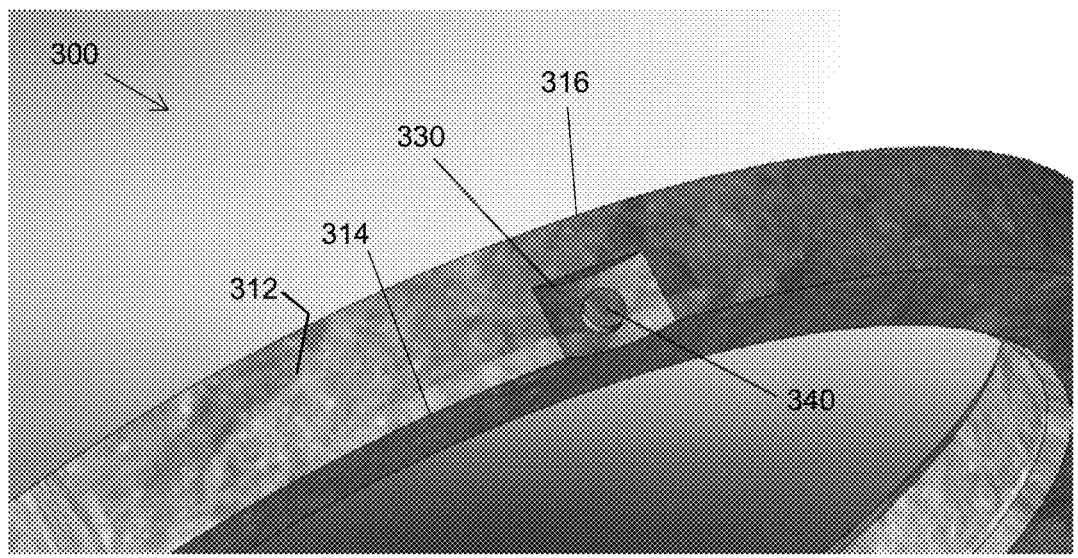
FIG. 4 is a partial schematic perspective view of the seal ring of FIG. 3.
Figure 5:
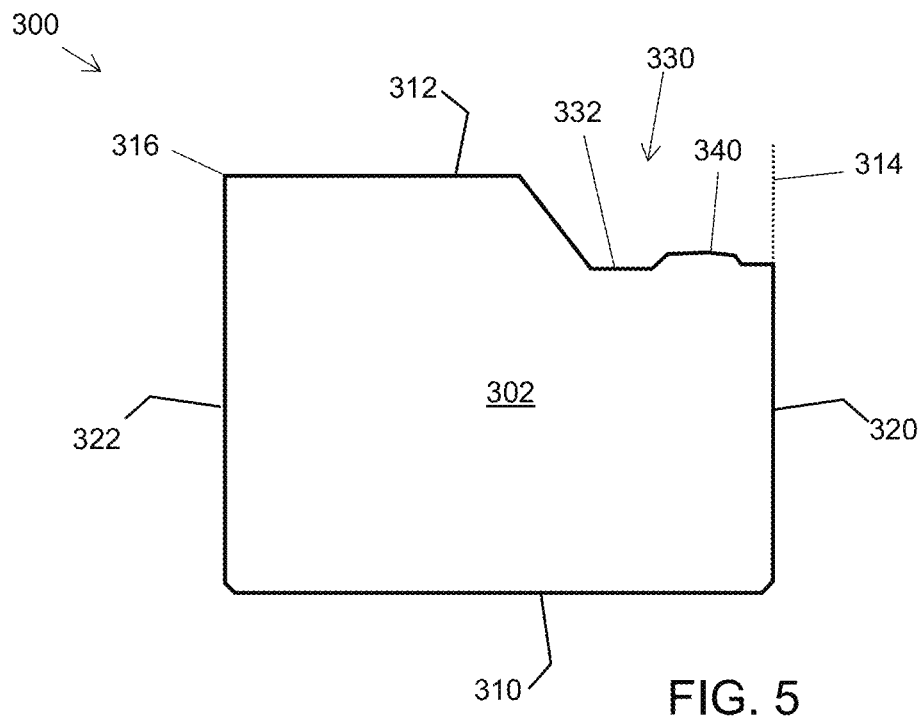
FIG. 5 is a cross-sectional schematic view of the seal ring of FIGS. 3 and 4.

The recess can be formed at a variety of lateral positions along the outer circumferential face between the first and lateral edges thereof. In certain embodiments of the seal rings as otherwise described herein, and as shown in the embodiment of FIGS. 3-5, the recess is formed along the first lateral edge of the outer circumferential face. The lateral distance between the recess (i.e., the lateral edge thereof) and the second lateral edge of the outer circumferential face is desirably sufficient to provide sufficient surface area to provide an adequate seal. For example, in certain embodiments of the seal rings as otherwise described herein, the lateral distance between the recess and the second lateral edge of the outer circumferential face is at least 0.2 mm, e.g., at least 0.5 mm or even at least 1.0 mm.

Figure 6:
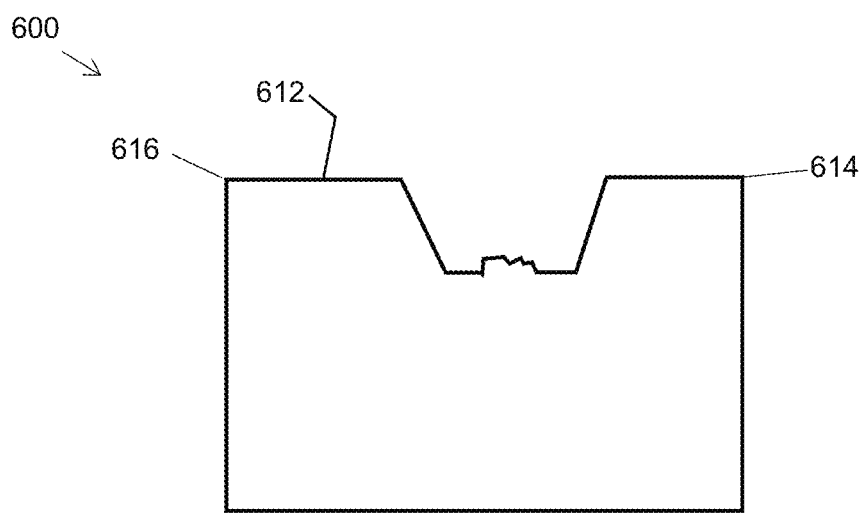
FIG. 6 is a cross-sectional schematic view of a seal ring according to another embodiment of the disclosure.

In other embodiments of the seal rings as otherwise described herein, the recess is formed between the first lateral edge and the second lateral edge of the outer circumferential face, such that the recess does not extend to either of the first lateral edge and the second lateral edge. Such an embodiment is shown in the cross-sectional schematic view (i.e. taken at a point along the circumference of the seal ring at which the recess is disposed) of FIG. 6. Here, recess 630 is formed between the first lateral edge 614 and the second lateral edge 616 of the outer circumferential face 612 of the seal ring 600. Notably, the recess 630 does not extend to either lateral edge 614 or 616. Here, too, the lateral distance between the recess (i.e., each lateral edge thereof) and the first and second lateral edges of the outer circumferential face is desirably sufficient to provide sufficient surface area to provide an adequate seal. For example, in certain embodiments of the seal rings as otherwise described herein, the lateral distance between the recess and the first lateral edge of the outer circumferential face is at least 0.1 mm, for example, at least 0.2 mm, at least 0.5 mm or even at least 1.0 mm. Similarly, in certain embodiments of the seal rings as otherwise described herein, the lateral distance between the recess and the second lateral edge of the outer circumferential face is at least 0.1 mm, for example, at least 0.2 mm, at least 0.5 mm or even at least 1.0 mm.

The recess can be provided in a variety of sizes. The person of ordinary skill in the art will, based on the present disclosure, provide a recess of an appropriate size such that the injection molding gate vestige can be disposed therein, yet the recess does not extend to both the first and second lateral edges of the outer circumferential face of the seal ring. In various embodiments of the seal rings as otherwise described herein, the recess can have, for example, an area (i.e., with respect to the occluded surface of the outer circumferential face) in the range of 1-20 $mm^2$, or 1-15 $mm^2$, or 1-10 $mm^2$, or 1-8 $mm^2$, or 1-5 $mm^2$, or 2-20 $mm^2$, or 2-15 $mm^2$, or 2-10 $mm^2$, or 2-8 $mm^2$, Similarly, the recess can be formed with a variety of depths. The person of ordinary skill in the art will, based on the present disclosure, provide a recess of an appropriate depth such that the injection molding gate vestige can be disposed therein without extending beyond the outer circumferential face of the seal ring. In various embodiments of the seal rings as otherwise described herein, the recess can have, for example, depth (i.e., with respect to the outer circumferential face) of at least 0.05 mm, for example, at least 0.1 mm or even at least 0.2 mm. The depth can be, for example, in the range of 0.05-2 mm, or 0.1-2 mm, or 0.2-2 mm, or 0.05-1 mm, or 0.1-1 mm, or 0.2-1 mm, or 0.05-0.7 mm, or 0.1-0.7 mm, or 0.2-0.7 mm.

As described above, the injection molding gate vestige does not extend beyond the outer circumferential face of the seal ring. Desirably, the injection molding gate vestige is disposed in the recess such that it is sufficiently far away from the level of the outer circumferential face to provide for relaxed manufacturing tolerances. For example, in certain embodiments of the seal rings as otherwise described herein, the injection molding gate vestige does not extend to within 0.2 mm, or even to within 0.5 mm of the level of the outer circumferential face.

The recess can be positioned at any convenient angular position along the circumference of the seal ring. For example, in certain embodiments of the seal ring as otherwise described herein, the recess is positioned at a position corresponding to an angle of 5-355 degrees, e.g., 15-345 degrees or 30-330 degrees with respect to engaged first and second ends of the seal ring. However, in certain embodiments, it may be desirable to position the recess at a point substantially away from 180 degrees with respect to engaged first and second ends of the seal ring. This area may experience high stress when the seal ring is flexed open to be installed around a shaft, and a recess may serve to weaken the seal ring to such flexion. Accordingly, in certain embodiments, the recess is positioned at a position corresponding to an angle of 5-135 degrees, or 15-135 degrees, or 30-135 degrees, or 225-330, or 225-345 degrees, or 225-355 degrees with respect to engaged first and second ends of the seal ring.

As the person of ordinary skill in the art will appreciate, the seal rings described herein can be made in a variety of sizes, depending on the particular parameters (e.g., shaft size, groove size, housing or bore inner diameter) of the system in which it is to be installed. For example, the seal rings described herein can be made having a variety of inner circumferences, for use with rotating shafts of a variety of sizes. in certain embodiments of the seal rings as otherwise described herein, the inner diameter (e.g., the diameter of the inner circumferential face) is in the range of 10 mm to 200 mm, e.g., 10-150 mm, or 10-100 mm, or 10-80 mm, or 10-50 mm, or 20-200 mm, or 20-150 mm, or 20-100 mm, or 20-80 mm, or 20-50 mm, or 40-200 mm, or 40-150 mm, or 40-100 mm, or 40-80 mm, or 40-50 mm.

Similarly, the seal rings described herein can be made having a variety of widths, to be fit into grooves variety of sizes. in certain embodiments of the seal rings as otherwise described herein, the width of the seal ring from the first lateral face to the second lateral face thereof is in the range of 1 mm to 20 mm, e.g., 1-10 mm, or 1-8 mm, or 1-6 mm, or 1-4 mm, or 2-20 mm, or 2-10 mm, or 2-8 mm, or 2-6 mm, or 2-4 mm, or 4-20 mm, or 4-10 mm, or 4-8 mm, or 6-20 mm, or 6-10 mm.

Figure 7:
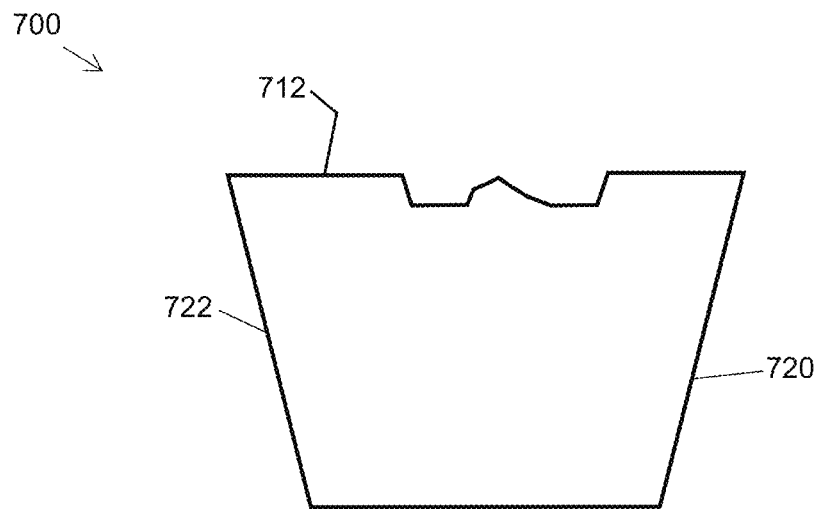
FIG. 7 is a cross-sectional schematic view of a seal ring according to another embodiment of the disclosure.
Figure 8:
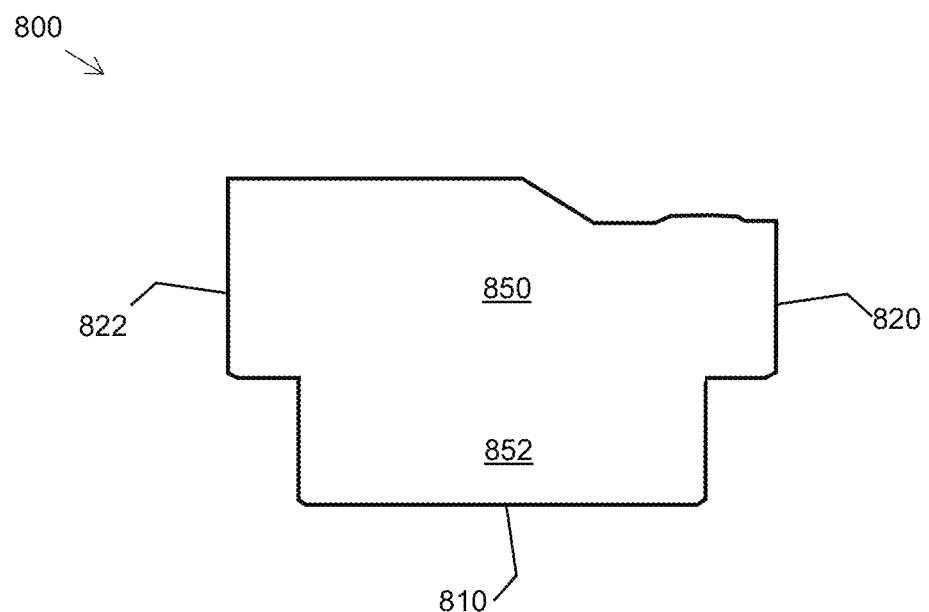
FIG. 8 is a cross-sectional schematic view of a seal ring according to another embodiment of the disclosure.

As the person of ordinary skill in the art will appreciate, the seal rings described herein can be formed with a variety of cross-sectional shapes. For example, certain embodiments of the seal rings as otherwise described herein have a rectangular cross-sectional shape (i.e., at a position along the circumference of the seal ring that does not include the recess or any of the engaging features of the first end or the second end. Seal ring 300 of FIGS. 3-5 has a substantially rectangular cross-section, with the first lateral face 320 being substantially parallel to the second lateral face 322. In other embodiments of the seal rings as otherwise described herein, the seal ring has a substantially trapezoidal cross-section. FIG. 7 is a schematic cross-sectional view of a seal ring 700 having a substantially trapezoidal cross-section, with the first lateral face 720 and the second lateral face 722 being canted from the normal to the outer circumferential face 712 by substantially the same angle. In other embodiments of the seal rings as otherwise described herein, the seal ring has a cross-sectional shape having a first rectangular section at the outer end thereof and a second, narrower rectangular section at the inner end thereof. FIG. 8 is a schematic cross-sectional view of a seal ring 800 having such a cross-section. Here, the first lateral face 820 and the second lateral face 822 are sealing faces disposed at either end of the first rectangular section 850, with second rectangular section 852 being disposed immediately adjacent first regular section 850 and extending to the inner circumferential face 810. Of course, the person of ordinary skill in the art will appreciate that other cross-sectional shapes may be used, depending, for example, on the particular geometry of a groove in which the seal ring is to be disposed. And the person of ordinary skill in the art will appreciate that the shapes described herein can include chamfers or rounded corners without substantially deviating from the described shapes. For example, the cross-sectional shape of FIG. 5 includes chamfered corners at the edges of the inner circumferential face, but is nonetheless considered to be rectangular.

Figure 9:
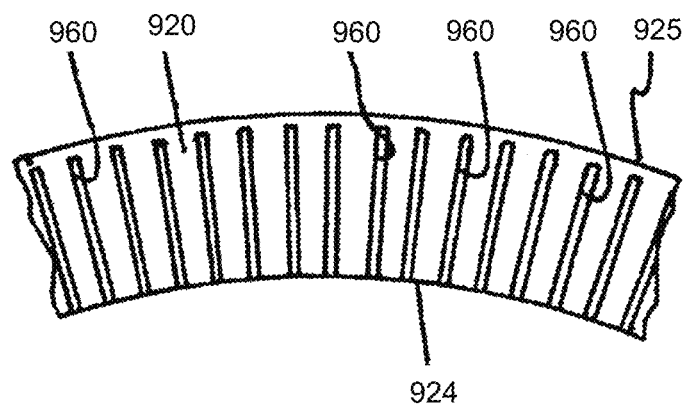
FIG. 9 is a schematic side view of a seal ring according to another embodiment of the disclosure.

A variety of additional features can be included in the seal rings described herein. For example, in certain embodiments of the seal rings as otherwise described herein, the first lateral face, the second lateral face, or both can include one or more grooves formed therein. Grooves can be configured, for example, to pull oil or other lubricant up along the lateral face, and thus help maintain sufficient oil between the lateral face and a groove sidewall, in order to maintain a sufficient seal between the groove sidewall and the lateral face. An example of such a seal ring is shown in partial schematic lateral side view in FIG. 9. In certain embodiments, none of the grooves formed in the lateral face extends from an outer end of the lateral face to an inner end of the lateral face. For example, in the embodiment of FIG. 9, the grooves 960 extend to the inner end 924 of the lateral end face 920, but not to the outer end 925 thereof.

Figure 10:
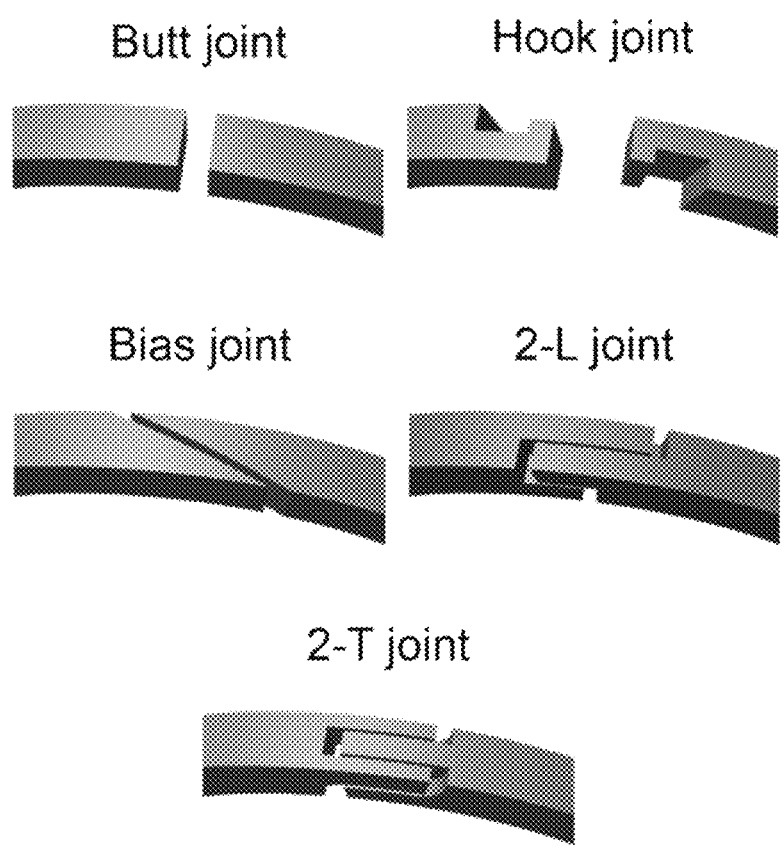
FIG. 10 is a set of perspective schematic views of different arrangements for the first and second ends according to various embodiments of the disclosure.

As briefly noted above, the second end is engageable with the first end to provide a ring seal having a circular outer circumference. As the person of ordinary skill in the art will appreciate, the first end and the second end can engage one another in various manners. For example, FIG. 10 provides partial perspective schematic views of a number of examples of engageable first and second ends for seal rings as otherwise described herein. Examples of types of engagement include a butt joint, a hook joint, a bias joint, a 2-L joint, and a 2-T joint. The person of ordinary skill in the art will appreciate, however, that a variety of types of engagement methods can be used with respect to the first and second ends of the seal ring. It is desirable that the ends can move relative to one another, e.g., to slightly expand or contract the circumference of the circular seal, in order to accommodate different tolerances and expansions.

Injection molding processes can be used to make the seal rings described herein from a variety of different materials. High-temperature thermoplastic materials are especially useful in the seal rings described herein. For example, certain embodiments of the seal rings as otherwise described herein are made from a material selected from a nylon (PA), polyphenylene sulfide (PPS), polyether ether ketone (PEEK), polyimide (PI), thermoplastic polyimide (TPI) and polyamide-imide (PAI). Such materials can be filled or unfilled.

Another aspect of the disclosure relates to a method for making an injection molded seal ring as otherwise described herein. The method includes providing a mold having a cavity having a shape that is the inverse of the shape of an injection molded seal ring as otherwise described herein, with an injection molding gate coupled to the cavity at a position in the recess corresponding to the position of the injection molding gate vestige of the seal ring; injecting molten polymer into the cavity through the gate; allowing the polymer to harden; removing the seal ring from the mold and forming the injection molding gate vestige by detaching it from a polymer runner at a surface of the recess of the seal ring. The person of ordinary skill in the art will use, in view of the description herein, conventional injection molding apparati and techniques in the practice of the methods described here.

The seal rings described herein find industrial use in a wide variety of rotating seal ring applications. For example, the seal rings described herein can be used in the clutch pack of a transmission for heavy equipment such as bulldozers and heavy duty trucks, as such seal rings can withstand pressure conditions as high as 400 psi, even under high rotational speeds. The seal rings described herein can be useful in a variety of types of apparati, including transmissions such as automatic transmissions, continuous variable transmissions, and dual-clutch transmissions, as well as in differentials and in camshaft adjustment.

Figure 2:
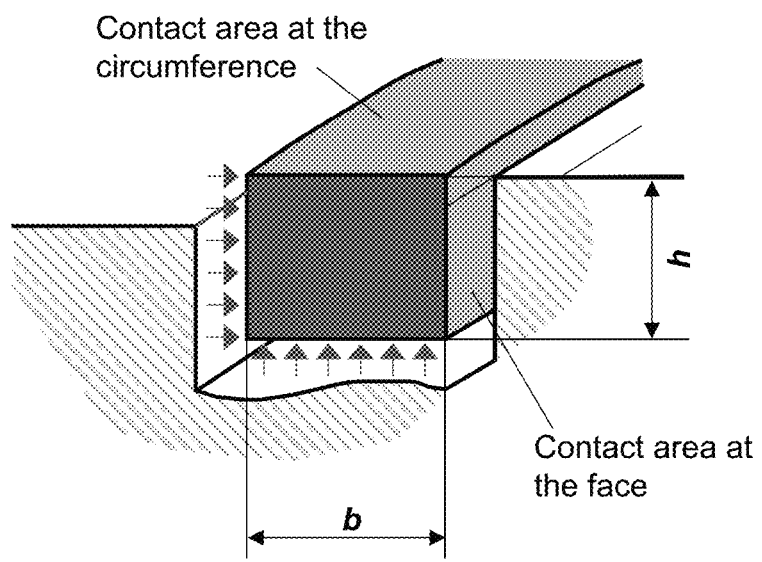
FIG. 2 is a schematic cross-sectional view of a seal ring assembly in the conventional rotating connection of FIG. 1.

Accordingly, another embodiment of the disclosure is an apparatus comprising a rotating shaft, a seal ring as described herein disposed about the shaft, with its first lateral face and/or its second lateral face disposed against a sidewall of a groove associated with the rotating shaft; and a housing or a bore disposed about the shaft and the seal ring, such that the outer circumferential face of the seal ring is disposed against an inner circumferential face of the housing or bore. A lubricant such as oil can be disposed at the outer circumferential face and the sealing lateral face(s) of the seal ring to provide for complete sealing. This arrangement is shown above with respect to FIGS. 1 and 2, as described above. Notably, for the reasons described above, the presence of the injection molding gate vestige at the outer circumferential face of the seal ring does not substantially interfere with sealing of that face to the bore or housing, as it is disposed in the recess below the level of the outer circumferential face. And the recess does not substantially interfere with the sealing of the outer circumferential face to the housing or bore because it does not extend all the way through the width of the outer circumferential face.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

What is claimed is:

1. An injection molded seal ring comprising a circular ring body extending between a first end and a second end engageable with the first end, the circular ring body comprising
    an inner circumferential face;
    an outer circumferential face opposing the inner circumferential face having a first lateral edge and an opposed second lateral edge;
    a first lateral face extending between the inner circumferential face and the opposing outer circumferential face;
    a second lateral face opposing the first lateral face, disposed between the inner circumferential face and the opposing outer circumferential face;
    a recess formed in the outer circumferential face, the recess not extending to both the first lateral edge and the second lateral edge of the outer circumferential face; and
    an injection molding gate vestige disposed in the recess, the injection molding gate vestige not extending beyond the outer circumferential face.

2. The injection molded seal ring according to claim 1, wherein the injection molding gate vestige extends at least 200 microns from a surface of the recess on which it is disposed.

3. The injection molded seal ring according to claim 1, wherein the outer circumferential face has a surface roughness $R_a$ value less than 5 microns; a surface roughness $R_z$ value less than 20 microns; and/or a surface roughness $R_{max}$ value less than 30 microns, all measured as described in ISO 4287.

4. The injection molded seal ring according to claim 1, wherein each of the first lateral face and the second lateral face has a surface roughness $R_a$ value less than 5 microns; a surface roughness $R_z$ value less than 20 microns; and/or a surface roughness $R_{max}$ value less than 30 microns, all measured as described in ISO 4287.

5. The injection molded seal ring according to claim 1, wherein the recess is formed along the first lateral edge of the outer circumferential face.

6. The injection molded seal ring according to claim 5, wherein the lateral distance between the recess and the second lateral edge of the outer circumferential face is at least 0.5 mm.

7. The injection molded seal ring according to claim 5, wherein the lateral distance between the recess and the second lateral edge of the outer circumferential face is at least 1.0 mm.

8. An apparatus comprising
a rotating shaft;
a seal ring according to claim 7, disposed about the rotating shaft, with its first lateral face and/or its second lateral face disposed against a sidewall of a groove associated with the rotating shaft;
and a housing or a bore disposed about the shaft and the seal ring, such that the outer circumferential face of the seal ring is disposed against an inner circumferential face of the housing or bore.

9. The injection molded seal ring according to claim 1, wherein the recess is formed between the first lateral edge and the second lateral edge of the outer circumferential face, such that the recess does not extend to either of the first lateral edge and the second lateral edge.

10. The injection molded seal ring according to claim 9, wherein the lateral distance between the recess and the first lateral edge of the outer circumferential face is at least 0.2 mm, and the lateral distance between the recess and the second lateral edge of the outer circumferential face is at least 0.2 mm.

11. The injection molded seal ring according to claim 9, wherein the lateral distance between the recess and the first lateral edge of the outer circumferential face is at least 1.0 mm, and the lateral distance between the recess and the second lateral edge of the outer circumferential face is at least 1.0 mm.

12. An apparatus comprising
a rotating shaft;
a seal ring according to claim 11, disposed about the rotating shaft, with its first lateral face and/or its second lateral face disposed against a sidewall of a groove associated with the rotating shaft;
and a housing or a bore disposed about the shaft and the seal ring, such that the outer circumferential face of the seal ring is disposed against an inner circumferential face of the housing or bore.

13. The injection molded seal ring according to claim 1, wherein the recess has an area in the range of 1 mm$^2$ to 20 mm$^2$.

14. The injection molded seal ring according to claim 1, wherein the recess has a depth in the range of 0.05 mm-2 mm.

15. The injection molded seal ring according to claim 1, wherein the injection molding gate vestige does not extend to within 0.2 mm of the level of the outer circumferential face.

16. The injection molded seal ring according to claim 1, wherein the recess is positioned at a position corresponding to an angle of 30-330 degrees with respect to engaged first and second ends of the seal ring.

17. The injection molded seal ring according to claim 1, having an inner diameter in the range of 10 mm to 200 mm.

18. The injection molded seal ring according to claim 1, having a width from the first lateral face to the second lateral face in the range of 1 mm to 20 mm.

19. The injection molded seal ring according to claim 1, having a substantially rectangular cross-sectional shape or a substantially trapezoidal cross-sectional shape.

20. The injection molded seal ring according to claim 1, having a cross-sectional shape having a first rectangular section at the outer end thereof and a second, narrower rectangular section at the inner end thereof.

21. The injection molded seal ring according to claim 1, wherein the first end is engageable with the second end via a 2-T joint or a 2-L joint.

22. A method for making the injection molded seal ring according to claim 1, comprising
providing a mold having a cavity, the cavity having a that is the inverse of the injection molded seal ring, with an injection molding gate coupled to the cavity at a position in the recess corresponding to the position of the injection molding gate vestige of the seal ring;
injecting molten polymer into the cavity through the gate;
allowing the polymer to harden; and
removing the seal ring from the mold and forming the injection molding gate vestige by detaching it from a polymer runner at a surface of the recess of the seal ring.

23. An apparatus comprising
a rotating shaft;
a seal ring according to claim 1, disposed about the rotating shaft, with its first lateral face and/or its second lateral face disposed against a sidewall of a groove associated with the rotating shaft;
and a housing or a bore disposed about the shaft and the seal ring, such that the outer circumferential face of the seal ring is disposed against an inner circumferential face of the housing or bore.

* * * * *